Patented Nov. 13, 1945

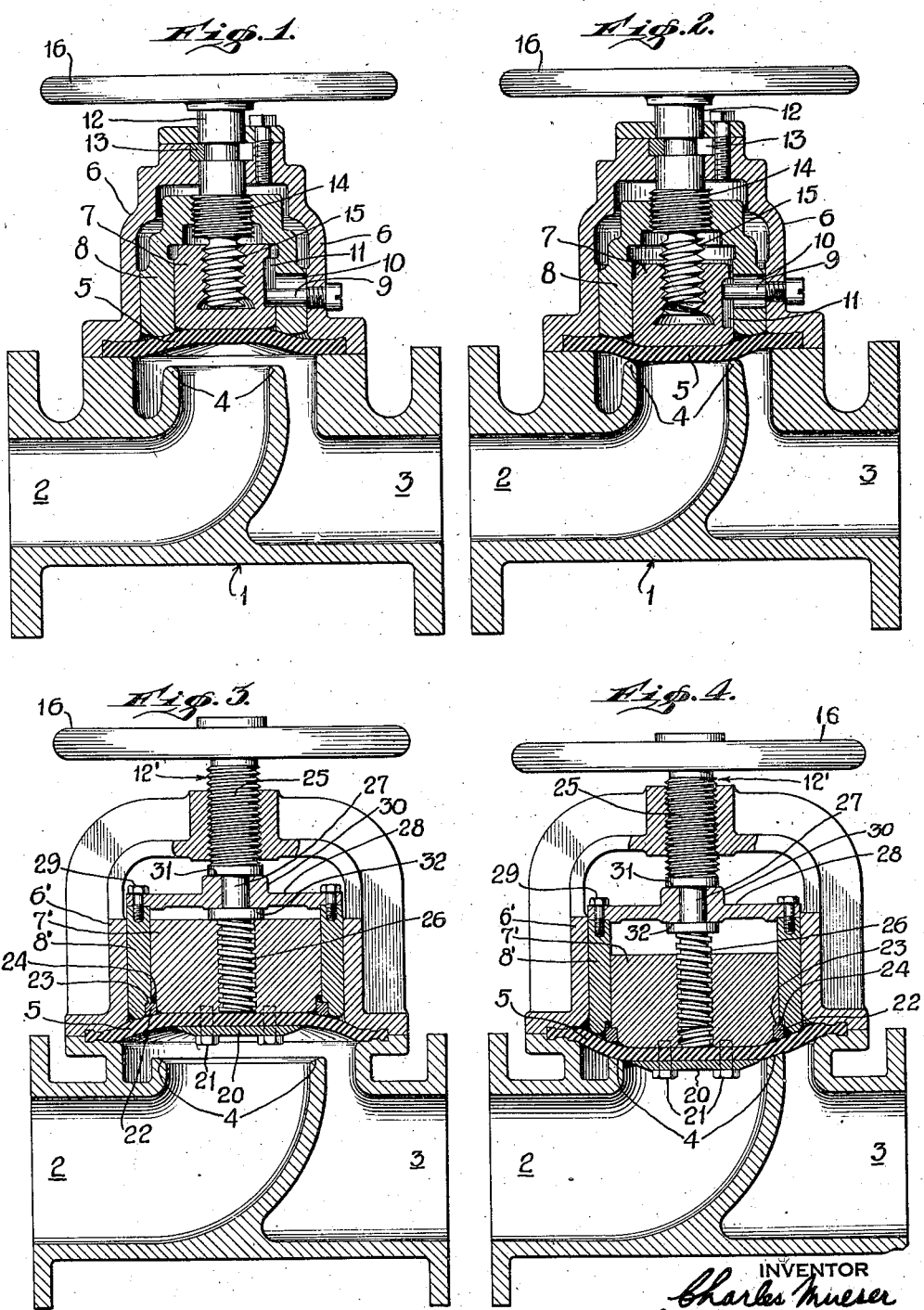

2,388,989

UNITED STATES PATENT OFFICE 2,388,989

DIAPHRAGM VALVE

Charles Mueser, Verona, N. J., assignor to T. Shriver & Company, Inc., Harrison, N. J., a corporation of New Jersey Application April 8, 1944, Serial No. 530,144

10 Claims. (Cl. 251—24)

This invention is concerned with diaphragm valves of the kind disclosed and claimed in copending application Serial No. 529,908, filed April 7, 1944, and is related to the invention of that application in that it provides another type of differential control for a diaphragm valve having a plurality of concentric backing members adapted to be so actuated in response to rotation of the valve stem as to partake of different movements appropriate to the travel (in moving from open to closed position) of those portions of the diaphragm which the respective backing members engage. As described below in detail with reference to the accompanying drawing, the valves of the present invention incorporate differential screw means to achieve the stated purpose.

In the drawing, Figs. 1 and 2 are sectional views of one form of valve embodying the invention, showing the valve in open and closed position, repectively, and Figs. 3 and 4 are sectional views of another form, likewise showing the valve in open and closed position, respectively.

Referring first to the form of the invention illustrated in Figs. 1 and 2, the valve comprises a hollow body 1 having a flow passage, of which the inlet and outlet are marked 2 and 3, respectively, and incorporating an upstanding seat 4. In accordance with the invention this seat may be, and preferably is, of annular form with its central aperture quite unobstructed and of a diameter substantially equal to the maximum diameter of the flow passage. Mounted above the seat and extending across the open top of the valve body is a diaphragm 5 which is adapted to be flexed into and out of sealing engagement with seat 4 to close and open the flow passage.

As shown, the over-all diameter of the diaphragm is considerably greater than that of seat 4 and the outer, marginal portion of the diaphragm is clamped to the top of the valve body, as by bonnet 6, at such a distance from the seat that an annular portion of the diaphragm outside the bounds of the seat is free to flex.

Engaging the upper face of the diaphragm are a number of concentric backing members, consisting in this instance of a main or central backing member 7 encircled by an auxiliary annular backing member 8, the latter engaging the annular portion of the diaphragm intermediate its clamped edge and seat 4. These members are relatively movable in a direction normal to the diaphragm and are conveniently dimensioned to have a sliding fit upon one another and within the bonnet 6. Also, they are preferably held against rotation within the bonnet, as by stud 9 threaded in the bonnet with its inner end passing through and into a locating hole 10, and slot 11, respectively, in the outer and inner backing members. Incidentally, it may be stated at this juncture that the terms "diameter," "concentric," "annular" etc. are not used herein as words of limitation to confine the respective parts to such as are truly circular, as, obviously, other appropriate shapes, such as regular polygons, will serve equally well.

The primary function of the members 7 and 8 is to apply pressure to the back of the diaphragm to flex it downwardly into engagement with seat 4 to close the flow passage, and to do this by advancing the central and outer portions of the diaphragm different distances commensurate with the different travel required of such portions to effect a close seal with the seat without undue distortion of any part of the diaphragm. Conversely, the members 7 and 8 are adapted to be withdrawn in similar fashion so as to provide a uniform backing or support for the diaphragm against undue distortion of any part of it under the pressure of the medium flowing through the valve when the same is open.

As stated above, the present invention provides differential screw means for actuating the backing members in the manner described.

Still referring to Figs. 1 and 2, an actuating stem 12 is journaled in the top of bonnet 6, being free to rotate but held against axial movement, as by lock ring 13. Within the bonnet the stem is provided with upper and lower threaded sections 14 and 15 of different pitch. As shown, the main or central backing member 7 is threaded on the lower section 15, while the upper end or drive portion of the auxiliary backing member 8 is threaded on the upper section 14.

The pitch of section 15 is greater than that of section 14, with the result that upon rotation of stem 12 by hand wheel 16 the backing member 7 will travel farther than backing member 8 throughout the movement of the diaphragm from its open (Fig. 1) to its closed (Fig. 2) position; and, of course, the same is true of the return stroke as the stem is raised. As will be apparent, the relative pitches of the two threaded sections of the stem are so selected that the backing members are caused to travel distances commensurate with the movements required of the respective portions of the diaphragm to preserve its general form without excessive flexure at any point. Also, as will be recognized, the setting of the backing members may be so adjusted that when the valve is closed, the outer backing member may apply just sufficient pressure to the outer annular portion of the diaphragm to cause a slight wrap-around of the diaphragm upon its annular seat. By this means a most effective seal is provided without undue strain upon or distortion of the diaphragm.

Referring now to the form of the invention shown in Figs. 3 and 4, the same or similar reference characters are applied to corresponding parts. Although not so shown, the backing members may likewise be held against rotation by such means as the stud 9 of Figs. 1 and 2. In this form (and the Figs. 1–2 form can also be so constructed) the diaphragm is secured to the central backing member 7', as by clamping plate 20 and bolts 21, and a narrow intermediate backing member in the form of a ring 22 is provided. As shown, ring 22 engages and is located by a shoulder 23 on the outer backing member when the valve is open (Fig. 3); and a shoulder 24 on the central backing member operates to move ring 22 to its lower position when the valve is closed (Fig. 4).

As before, the actuating stem 12' is provided with upper and lower threaded sections, 25 and 26, but in this instance they are of opposite pitch, one being right-handed and the other left-handed. Also, the stem moves axially as the hand wheel 16 is rotated, the upper section 25 being threaded directly into the top of the bonnet. Intermediate the threaded sections of the stem is a section 27 to which the outer backing member 8' is connected, as by means of a plate 28 secured by bolts 29 to member 8' and having a hub or drive portion 30 which loosely embraces the stem between shoulders 31 and 32. Thus, in this form, the outer backing member and the stem move axially as one.

As in the previous form, the lower section 26 of the stem is threaded directly into the central backing member, but, as stated, the threads of this section are of opposite pitch to those of section 25. In the result, the motion imparted to member 7' is greater than that imparted to member 8', being, of course, equal to the sum of the two pitches for each turn of the stem. Thus, again, by the selection of appropriate pitches, the desired relative motions of the backing members are obtained, and close control of the form of the diaphragm at all times is maintained. It will be observed that in both of the illustrated forms of the invention the entire active portion of the diaphragm is under close control of the backing members not only in the full closed and full open positions of the valve but also throughout the full flexing stroke of the diaphragm in both directions.

It being understood that the foregoing forms of the invention are illustrative only, and that the invention is susceptible of embodiment in various forms to suit the conditions at hand, the following is claimed.

I claim:

1. In a valve, the combination with a flow passage including a seat, and a diaphragm adapted to be flexed into and out of engagement with the seat to open and close the flow passage and of a diameter, relative to the diameter of the seat, such that an annular portion of the diaphragm outside the bounds of the seat is free to flex, of a main backing member engaging the central portion only of the diaphragm on the side remote from the seat, an auxiliary backing member adapted to engage the said annular portion of the diaphragm outside the bounds of the seat, said main backing member and said auxiliary backing member each being movable with respect to the other, a rotatable stem, and differential screw means actuated thereby to move the main backing member a distance commensurate with the travel of the central portion of the diaphragm in moving from open to closed position and said auxiliary backing member a distance commensurate with the lesser travel of the said annular portion of the diaphragm, said screw means comprising oppositely threaded sections of unequal pitch.

2. In a valve, the combination with a flow passage including a seat, and a diaphragm adapted to be flexed into and out of engagement with the seat to open and close the flow passage, of a central backing member engaging the central portion only of the diaphragm on the side remote from the seat, an annular backing member surrounding the central backing member and engaging an annular portion of the diaphragm surrounding the said central portion thereof, said central backing member and said annular backing member each being movable with respect to the other, an actuating stem having a lower threaded portion of one pitch and in threaded engagement with the central backing member, and having an upper threaded portion of a smaller pitch and in threaded engagement with said annular backing member, means for holding said backing members against rotation but with freedom for movement in a direction axially of the stem, and means for holding the stem against axial movement but with freedom to rotate.

3. In a valve of the kind described, the combination with a bonnet and a diaphragm having its marginal portion clamped thereby to a valve body, of a plurality of concentric members mounted for sliding movement upon one another and within the bonnet each of said members being movable with respect to the other, end portions of said members engaging the back of the diaphragm, a manually rotatable stem mounted in the bonnet, and differential screw means for actuating said members in response to rotation of said stem, said screw means comprising similarly threaded sections of unequal pitch.

4. In a valve, the combination with a valve body having a flow passage, of an annular seat located in said passage and having an unobstructed aperture therethrough of a diameter substantially equal to the maximum diameter of the flow passage, a diaphragm mounted on the valve body and adapted to be flexed into and out of engagement with said seat to open and close the flow passage, relatively movable concentric backing members engaging the diaphragm on the side remote from the seat, an actuating stem, and differential screw means for independently moving each of said members relative to the seat and to each other in response to rotation of said stem, said screw means comprising oppositely threaded sections.

5. In a valve, the combination with a valve body having a flow passage, of an annular seat located in said passage and having an unobstructed aperture therethrough of a diameter substantially equal to the maximum diameter of the flow passage, a diaphragm mounted on the valve body and adapted to be flexed into and out of engagement with said seat to open and close the flow passage, concentric backing members engaging the diaphragm on the side remote from the seat, each of said members being movable with respect to the other, a stationary support mounted on the body and an actuating stem having threaded engagement therewith, a direct connection between said stem and one of the backing members, and a second and oppositely threaded portion on the stem having threaded engagement with another of said members.

6. In a valve, the combination with a flow passage including a seat, and a diaphragm adapted to be flexed into and out of engagement with the seat to open and close the flow passage, of a central backing member engaging the central portion only of the diaphragm on the side remote from the seat, an annular backing member surrounding the central backing member and engaging an annular portion of the diaphragm surrounding the said central portion thereof, said backing member and said annular member each being movable with respect to the other, an actuating stem having a lower threaded portion in threaded engagement with the central backing member, and having an upper differentially threaded portion adapted to control the movement of said annular backing member independently of the central backing member.

7. In a valve, the combination with a flow passage including a seat, and a diaphragm adapted to be flexed into and out of engagement with the seat to open and close the flow passage, of a central backing member engaging the central portion only of the diaphragm on the side remote from the seat, an annular backing member surrounding the central backing member and engaging an annular portion of the diaphragm surrounding the said central portion thereof, said backing member and said annular member each being movable with respect to the other, an actuating stem having a lower threaded section engaged with the central backing member, an upper differentially threaded section, and an unthreaded section, a bonnet portion, and a drive portion associated with said annular backing member and independent of said central backing member, one of said bonnet and drive portions rotatably engaging the unthreaded section of the stem and held against longitudinal movement relatively thereto, and the other of said bonnet and drive portions engaging the said differentially threaded section.

8. In a valve, the combination with a flow passage including a seat, and a diaphragm adapted to be flexed into and out of engagement with the seat to open and close the flow passage, of a central backing member engaging the central portion only of the diaphragm on the side remote from the seat, an annular backing member surrounding the central backing member and engaging an annular portion of the diaphragm surrounding the said central portion thereof, said backing member and said annular member each being movable with respect to the other, a rotatable stem, and differential screw means actuated thereby to move said central backing member a distance commensurate with the travel of the central portion of the diaphragm in moving from open to closed position and said annular backing member a distance commensurate with the lesser travel of the said annular portion of the diaphragm, said screw means comprising similarly threaded sections of unequal pitch, the section of lesser pitch engaging the annular backing member and the section of greater pitch engaging the central backing member.

9. In a valve, the combination with a flow passage including a seat, and a diaphragm adapted to be flexed into and out of engagement with the seat to open and close the flow passage, of a central backing member engaging the central portion only of the diaphragm on the side remote from the seat, an annular backing member surrounding the central backing member and engaging an annular portion of the diaphragm surrounding the said central portion thereof, said central backing member and said annular backing member each being movable with respect to the other, an actuating stem having its lower end in threaded engagement with the central backing member and rotatable to raise and lower the same, an upper portion of the stem having an oppositely threaded section and of smaller pitch than said lower end, and means connecting said section with the annular backing member to raise and lower the same upon rotation of the stem but to a lesser extent than the main backing member.

10. In a valve, the combination with a flow passage including a seat, and a diaphragm adapted to be flexed into and out of engagement with the seat to open and close the flow passage, of a central backing member engaging the central portion only of the diaphragm on the side remote from the seat, an annular backing member surrounding the central backing member and engaging an annular portion of the diaphragm surrounding the said central portion thereof, said central backing member and said annular backing member each being movable with respect to the other, a bonnet, an actuating stem having a lower portion in threaded engagement with the central backing member and having an upper portion in threaded engagement with the bonnet, the threads of one of said portions being right-handed and the threads of the other of said portions being left-handed, means to hold the backing members against rotation but with freedom for movement in a direction axially of the stem, and means independent of the central backing member to transmit the axial movement of the stem to the annular backing member.

CHARLES MUESER.